United States Patent
Loudon et al.

(10) Patent No.: US 10,572,287 B2
(45) Date of Patent: Feb. 25, 2020

(54) CONFIGURING VIRTUAL MACHINES ON CORES BASED ON PRIORITY

(71) Applicant: METASWITCH NETWORKS LTD., Enfield (GB)

(72) Inventors: Calum Sutherland Loudon, London (GB); Peter Louis White, London (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 15/499,047

(22) Filed: Apr. 27, 2017

(65) Prior Publication Data

US 2017/0315835 A1 Nov. 2, 2017

(30) Foreign Application Priority Data

Apr. 28, 2016 (GB) .................................. 1607439.5

(51) Int. Cl.
*G06F 9/455* (2018.01)
*H04L 12/911* (2013.01)
*G06F 9/50* (2006.01)

(52) U.S. Cl.
CPC ........ *G06F 9/45558* (2013.01); *G06F 9/5027* (2013.01); *G06F 9/5077* (2013.01); *H04L 47/821* (2013.01); *G06F 9/5083* (2013.01); *G06F 2009/4557* (2013.01); *G06F 2009/45575* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,673,113 B2* | 3/2010 | Sugumar | ............... | G06F 9/5088 711/170 |
| 8,151,085 B2* | 4/2012 | Deutschle | ........... | G06F 12/0888 711/118 |
| 8,230,434 B2* | 7/2012 | Armstrong | ............ | G06F 9/5077 713/1 |
| 8,281,312 B2* | 10/2012 | Gnanasambandam | | ...................... G06F 3/1217 710/22 |

(Continued)

OTHER PUBLICATIONS

"Virt driver pinning guest vCPUs to host pCPUs," Open Stack; /specs.openstack.org/openstack/nova-specs/specs/juno/approved/virt-driver-cpu-pinning.html.

(Continued)

*Primary Examiner* — Abu Zar Ghaffari
(74) *Attorney, Agent, or Firm* — EIP US LLP

(57) ABSTRACT

Measures, including methods, systems and computer-readable storage mediums, for use in configuring virtual machines on a host device including a plurality of processing cores. A first virtual machine is configured to run on a subset of cores of the plurality. The first virtual machine is of a first type. A second virtual machine is configured to run on any of the cores in the plurality. The second virtual machine is of a second, different type. The first virtual machine is configured to have a first priority which is higher than a second priority of the second virtual machine such that processing resources are available to the first virtual machine when required by the first virtual machine instead of being available to the second virtual machine.

16 Claims, 5 Drawing Sheets

(56) References Cited

U.S. PATENT DOCUMENTS

| | | | | |
|---|---|---|---|---|
| 8,479,195 B2* | 7/2013 | Adams | | G06F 9/45504 |
| | | | | 718/1 |
| 8,806,497 B2* | 8/2014 | Sinz | | G06F 9/46 |
| | | | | 718/100 |
| 8,918,784 B1* | 12/2014 | Jorgensen | | G06F 9/5077 |
| | | | | 718/1 |
| 9,471,358 B2* | 10/2016 | Goel | | G06F 11/1484 |
| 9,710,295 B2* | 7/2017 | Yamaguchi | | G06F 9/5077 |
| 9,836,334 B2* | 12/2017 | Divirgilio | | G06F 9/3851 |
| 9,842,004 B2* | 12/2017 | Ferris | | G06F 9/4856 |
| 9,846,589 B2* | 12/2017 | Udupi | | G06F 9/45558 |
| 9,864,636 B1* | 1/2018 | Patel | | G06F 9/5061 |
| 9,921,866 B2* | 3/2018 | Ganguli | | G06F 9/45558 |
| 10,268,522 B2* | 4/2019 | Ferris | | G06F 9/5072 |
| 2001/0054055 A1* | 12/2001 | Bollella | | G06F 9/45533 |
| | | | | 718/102 |
| 2006/0294524 A1 | 12/2006 | Vega | | |
| 2011/0161955 A1* | 6/2011 | Woller | | G06F 9/4406 |
| | | | | 718/1 |
| 2011/0179132 A1 | 7/2011 | Mayo et al. | | |
| 2013/0042003 A1* | 2/2013 | Franco | | H04L 67/1097 |
| | | | | 709/226 |
| 2013/0097293 A1* | 4/2013 | Gibson | | H04L 43/0876 |
| | | | | 709/221 |
| 2013/0254767 A1* | 9/2013 | Mizuno | | G06F 9/455 |
| | | | | 718/1 |
| 2013/0346966 A1* | 12/2013 | Natu | | G06F 9/45558 |
| | | | | 718/1 |
| 2014/0007097 A1* | 1/2014 | Chin | | G06F 9/45533 |
| | | | | 718/1 |
| 2014/0040474 A1* | 2/2014 | Blagodurov | | G06F 9/5088 |
| | | | | 709/226 |
| 2014/0053153 A1* | 2/2014 | Kozakai | | G06F 9/45533 |
| | | | | 718/1 |
| 2014/0122920 A1* | 5/2014 | Ziskind | | G06F 11/1484 |
| | | | | 714/4.11 |
| 2014/0173595 A1* | 6/2014 | Anand | | G06F 9/455 |
| | | | | 718/1 |
| 2014/0380307 A1* | 12/2014 | Zhu | | G06F 9/45533 |
| | | | | 718/1 |
| 2015/0040131 A1* | 2/2015 | Shan | | G06F 9/5027 |
| | | | | 718/1 |
| 2015/0143363 A1* | 5/2015 | Gombert | | G06F 9/45533 |
| | | | | 718/1 |
| 2015/0169350 A1* | 6/2015 | Anand | | G06F 9/45558 |
| | | | | 718/1 |
| 2015/0193245 A1* | 7/2015 | Cropper | | G06F 9/45533 |
| | | | | 718/1 |
| 2015/0212840 A1* | 7/2015 | Biran | | G06F 9/45558 |
| | | | | 718/1 |
| 2015/0281314 A1* | 10/2015 | Bragstad | | H04L 41/5025 |
| | | | | 709/219 |
| 2016/0092259 A1* | 3/2016 | Mehta | | G06F 9/45558 |
| | | | | 718/1 |
| 2016/0092677 A1 | 3/2016 | Patel et al. | | |
| 2016/0162666 A1* | 6/2016 | Casey | | G06F 9/45558 |
| | | | | 726/29 |

OTHER PUBLICATIONS

"Instance Type Extra Specs clarifications," GT.net, Aug. 24, 2012; gossamer-threads.com/lists/openstack/dev/18381.

Steve Gordon, "Driving in the Fast Lane—CPU Pinning and NUMA Topology Awareness in OpenStack Compute," Red Hat Stack, May 5, 2015; redhatstackblog.redhat.com/2015/05/05/cpu-pinning-and-numa-topology-awareness-in-openstack-compute/.

Frank Denneman, "Beating a dead horse—using CPU affinity," Red Hat Stack, Jan. 11, 2011; redhatstackblog.redhat.com/2015/05/05/cpu-pinning-and-numa-topology-awareness-in-openstack-compute/.

* cited by examiner

CONFIGURING VIRTUAL MACHINES ON CORES BASED ON PRIORITY

CROSS-REFERENCE TO RELATED APPLICATIONS

This application claims priority under 35 U.S.C. § 119(a) to UK Patent Application No. GB 1607439.5, filed on Apr. 28, 2016, the entire content of which is hereby incorporated by reference.

BACKGROUND OF THE INVENTION

Field of the Invention

The present disclosure relates to configuration of host devices. In particular, but not exclusively, the present disclosure relates to configuration of virtual machines on host devices comprising a plurality of processing cores.

Description of the Related Technology

Data center deployments, including cloud computing environments, typically provide a computational resource in the form of a number of host devices (or 'servers' or 'host servers'), which can be utilized for various computational tasks, such as data processing, file serving, application hosting and provisioning telecommunications services. Such host devices are typically comprised within a data center network which interconnects the various host devices in the data center deployment and facilitates communication between them. Commonly, the data center network will take the form of a local area network (LAN), which is deployed at a data center facility which houses the various host devices and other hardware involved in the data center deployment.

More recently, particularly in cloud computing environments, a data center deployment may include host devices at different geographic locations. Such deployments may be referred to as distributed data centers. A distributed data center network may provide geographical redundancy to the data center deployment, such that a disruption or failure at a particular data center facility does not result in a loss of service, as the required computation can be provided by host devices at other data center facilities in the data center network.

The computational resource provided by a data center may be utilized in various ways. In one variety of architecture, each host device in a data center may have a dedicated function or set of functions to perform. However, this can result in poor scalability and inefficient hardware-resource utilization because some functions in the data center network may not utilize all of the hardware resources that have been allocated. To address this, virtualization techniques have been developed which allow a virtual system (or 'guest') to be created and deployed on a real, physical machine (or 'host' or 'host device') such as a server. Varieties of known guest virtual systems include virtual machines, as well as virtual environments (such as Linux Containers; LXC). The virtual system then behaves as if it were an independent machine or environment with a defined function or set of functions to perform.

One of the benefits that use of virtualization can provide in data center networks is that multiple guests can be deployed on a single host, with each guest sharing the available hardware resources of the host machine, but operating potentially independently of each other. If the guests running on a particular host are not making efficient use of the computational resource of the host machine (i.e. there is a significant amount of spare capacity available on the host), then an extra guest can be added to the host. Similarly, if the guests running on a particular machine require more combined computational resource than the host machine can provide, then one or more of the guests can be moved to a different host machine in the data center network. Additionally, if the overall demand on the data center network (or on a particular function in the data center network) increases, this demand can be met by setting up additional guests (either by utilizing spare capacity on one of the host machines in the data center network or by adding extra hosts to the data center network).

The guest virtual systems in a data center deployment may be virtualized as separate communication endpoints in the data center network (which may be configured as a local area network, or LAN, for example). In such deployments, each host server may act as a switch to pass data packets to and from the guests that it hosts.

In some data center deployments, all of the guests may belong to the same enterprise (or 'tenant'). Such deployments are known as single tenant data centers. Alternatively, so called multi-tenant data centers may include guests belonging to several different tenants. In order to provide segregation between the virtual systems of different tenants, e.g. for information security or conflict avoidance reasons, a number of virtual LANs may be configured in the network which provide connectivity between the various virtual systems associated with a given tenant, but not to virtual systems associated with different tenants.

Some of the functions running on guests in a data center may be time critical, in the sense that in order to deliver their service successfully they require timely and uncontended access to the host resources. Examples include communications services delivering audio and/or video streams to end users, where the nature of the service requires the guest to be able to send packets of media data every few milliseconds with little deviation in period between the packets. Other services are not, in the sense that if their access to resources is delayed, there is little or no impact on the end users. Examples include standard Web applications, where say a 20 ms delay in loading a Web page will not be noticed by the end user.

Many service providers desire to mix time critical and non-time critical services on the same network functions virtualization (NFV) cloud, for example to take advantage of spare general purpose compute resources that may be available during the night. However, service providers would like to do this while ensuring that time critical virtual machines get all the resources they need, otherwise audio quality may suffer, network timers may be breached, and service quality generally becomes unacceptable.

A known approach to achieve the above desire effectively partitions the cloud into two with two sets of hosts where one set is configured not to allow central processing unit (CPU) over-contention, and the other set is configured to permit it. The virtual machines are then "tagged" as they are created to run in one set or the other. Such a known approach is operationally expensive, complex and error-prone.

SUMMARY

According to embodiments, there is a method of configuring virtual machines on a host device comprising a plurality of processing cores, the method comprising:

configuring a first virtual machine to run only on a subset of cores of the plurality, the first virtual machine being of a first type;

configuring a second virtual machine to run on any of the cores in the plurality including at least one core in the subset, the second virtual machine being of a second, different type; and configuring the first virtual machine to have a first priority which is higher than a second priority of the second virtual machine such that processing resources are available to the first virtual machine when required by the first virtual machine instead of being available to the second virtual machine.

According to embodiments, there is a system for use in configuring virtual machines on a host device comprising a plurality of processing cores, the system comprising at least one memory including computer program code; and at least one processor in data communication with the at least one memory, wherein the at least one processor is configured to:

configure a first virtual machine to run only on a subset of cores of the plurality, the first virtual machine being of a first type;

configure a second virtual machine to run on any of the cores in the plurality including at least one core in the subset, the second virtual machine being of a second, different type; and configure the first virtual machine to have a first priority which is higher than a second priority of the second virtual machine such that processing resources are available to the first virtual machine when required by the first virtual machine instead of being available to the second virtual machine.

According to embodiments, there is a non-transitory computer-readable storage medium comprising computer-executable instructions which, when executed by a processor, cause a computing device to perform a method of configuring virtual machines on a host device comprising a plurality of processing cores, the method comprising:

configuring a first virtual machine to run only on a subset of cores of the plurality, the first virtual machine being of a first type;

configuring a second virtual machine to run on any of the cores in the plurality including at least one core in the subset, the second virtual machine being of a second, different type; and configuring the first virtual machine to have a first priority which is higher than a second priority of the second virtual machine such that processing resources are available to the first virtual machine when required by the first virtual machine instead of being available to the second virtual machine.

Further features of the present disclosure will become apparent from the following description of preferred embodiments, given by way of example only, which is made with reference to the accompanying drawings.

DETAILED DESCRIPTION OF CERTAIN INVENTIVE EMBODIMENTS

Figure 1:
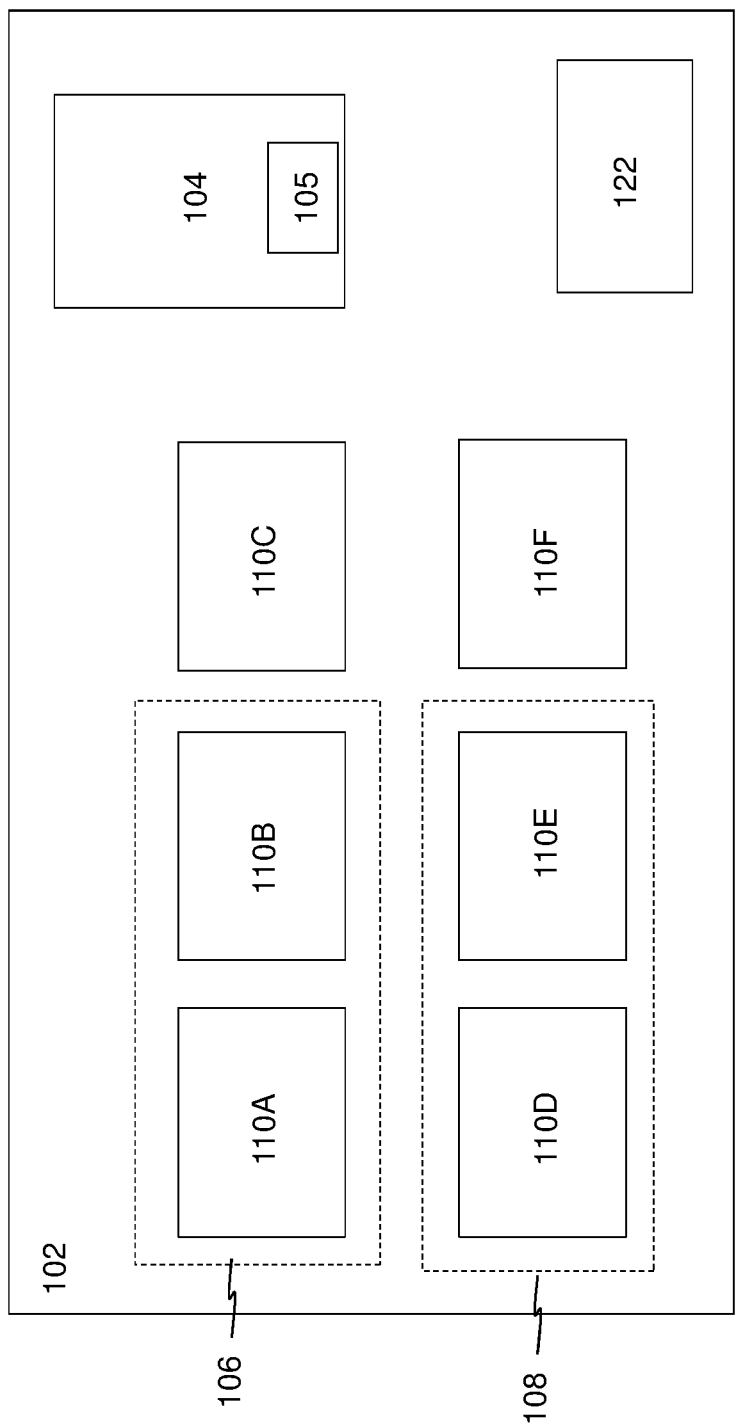
FIG. 1 shows a schematic diagram of a host device according to embodiments.

FIG. 1 shows a schematic diagram of a host device 102 according to embodiments. Host device 102 may comprise a server or other such computing device and may be located in a data center or cloud computing environment (either distributed or non-distributed) with one or more other host devices (not shown).

In the embodiments depicted in FIG. 1, host device 102 comprises a plurality of physical processing resources in the form of a plurality 110 of processing cores 110A, 110B, 110C, 110D, 110E, 110F which are capable of carrying out various data processing tasks. In other embodiments, host device 102 may have a higher or lower number of processing cores. In embodiments, the processing cores each comprise central processing unit (CPU) cores.

Host device 102 comprises a memory 122 which may comprise some volatile and some non-volatile memory. In other embodiments, host device 102 may have one or more other memories (not shown).

Host device 102 may host the one or more virtual machines through use of a controller 104 (or 'scheduler'). Controller 104 comprises a processor, processing system or microcontroller 105. In some embodiments, controller 104 comprises a virtualization tool such as a hypervisor. In such embodiments, a hypervisor may run on top of an existing operating system on the host device 102, or it may run directly on the host device hardware without an intermediate operating system (in a so called 'bare metal' configuration). In some embodiments, the hypervisor (not shown) comprises packet forwarding functionality. In some embodiments, a software tool such as OpenStack™ is used to run the virtual machines on host device 102 with a hypervisor. In some embodiments, host device 102 is configured with a Linux kernel, and may host the one or more virtual machines through the use of the virtualization tool Linux Containers (LXC).

Controller 104 controls configuration and allocation of the physical processing resources of host device 102 to one or more virtual resources such as one or more virtual machines.

In embodiments, the plurality 110 of processing cores 110A, 110B, 110C, 110D, 110E, 110F, memory 122, and controller 104 of host device 102 are connected together by one or more data buses (not shown).

Embodiments comprise measures, including methods, apparatus and computer program products, for use in configuring virtual machines on a host device 102 comprising a plurality 110 of processing cores. Some or all of the measures may for example be performed and/or controlled by controller 104 of host device 102.

In embodiments, a first virtual machine is configured to run on a subset 106 of cores of the plurality. The first virtual machine is of a first type. In this example embodiment, subset 106 comprises cores 110A and 110B of the plurality 110 of cores.

In alternative embodiments which are not currently claimed, instead of the first virtual machine being configured to run on a subset 106 of cores in the plurality, the first virtual machine is configured to run on all of the cores in the plurality.

In embodiments, a second virtual machine is configured to run on any of the cores in the plurality 100.

In embodiments, the second virtual machine is configured to run on any of the cores in the plurality 100 including at least one core 110A in subset 106.

In embodiments, configuring of the second virtual machine to run on any of the cores in the plurality comprises not identifying any specific cores on which the second virtual machine is to run on.

The second virtual machine is of a second, different type. In this example embodiment, the second virtual machine may run on any of cores 110A, 110B, 110C, 110D, 110E, 110F. In the embodiments depicted in FIG. 1, the at least one core in subset 106 comprises core 110A.

In embodiments, the first virtual machine is configured to have a first priority which is higher than a second priority of the second virtual machine such that processing resources are available to the first virtual machine when required by the first virtual machine instead of being available to the second virtual machine.

In embodiments, configuring the second virtual machine to run on any of the cores in the plurality comprises configuring the second virtual machine to run on any of the cores in the plurality including at least one core 110A in the subset such that the processing resource of the at least one core is available to the first virtual machine when required by the first virtual machine instead of being available to the second virtual machine.

According to embodiments, the processing resource of the at least one core 110A is rendered preferentially to the first virtual machine when demanded at the expense of the second virtual machine.

The first priority may for example comprise a maximum priority and the second priority may for example comprise a default priority (which is lower than the maximum priority).

Some embodiments comprise configuring the second virtual machine to have the second priority which is lower than the first priority of the first virtual machine. In other embodiments, the second virtual machine acquires the second priority according to a default setting.

According to embodiments, the first type comprises a type of virtual machine responsible for providing one or more time critical services. The first type may for example comprise a type of virtual machine responsible for performing media packet forwarding.

In embodiments, the second type comprises a type of virtual machine responsible for providing one or more non-time critical services. The second type may for example comprise a type of virtual machine responsible for performing billing applications.

According to embodiments, the at least one core 110A, 110B is at least partially required by the first virtual machine during a period of relatively high processing demand for the first virtual machine. According to embodiments, the at least one core 110A, 110B is fully utilized by the first virtual machine during a period of relatively high processing demand for the first virtual machine.

In embodiments, the at least one core 110A, 110B is not fully required by the first virtual machine during a period of relatively low processing demand for the first virtual machine; in such embodiments, the configuring of the first virtual machine to have the first priority which is higher than the second priority of the second virtual machine allows the processing resource of the at least one core to be at least partially available to the second virtual machine during the period of relatively low processing demand for the first virtual machine. Therefore, by use of embodiments, when resources are not being fully utilized by the first virtual machine, then at least some of these resources can be utilized by the second virtual machine.

By use of embodiments, the first virtual machine is provided with all of the processing resources it requires as and when it needs them. When the first virtual machine is under high load, its higher priority, compared to the priority of the second virtual machine, means that the first virtual machine has all of the processing resources it requires made available to it at the expense of the second virtual machine. So, for example, during low load of the first virtual machine, the second virtual machine may use the resources of core 110A when the first virtual machine is not using them. However, during high load of the first virtual machine, the resources of core 110A are not available to the second virtual machine, but the first virtual machine can make use of the resources of core 110A.

In embodiments, the configuring of the first virtual machine comprises pinning the first virtual machine to run only on the subset 106 of cores of the plurality. Due to this pinning, the first virtual machine is dedicated to run on cores 110A and 110B only.

In embodiments, the configuring of the second virtual machine comprises not pinning the second virtual machine to run on any particular core of the plurality 110. In embodiments, the configuring of the second virtual machine comprises not pinning the second virtual machine to run on any cores of the plurality 110 on which the first virtual machine is configured. In embodiments, the configuring of the second virtual machine comprises not pinning the second virtual machine to run on any cores of the plurality 110 on which the first virtual machine is pinned. In embodiments, the second virtual machine is not pinned to any particular cores so may run on any of the cores in the plurality 110.

Embodiments comprise prohibiting pinning of any other virtual machine of the first type on the subset of cores of the plurality. This prohibition prevents any contention between virtual machines of the first type such that virtual machines of the first type are provided with the processing resources they require as and when they need them.

In embodiments, a third virtual machine is configured to run on a further subset 108 of cores of the plurality. In this example embodiment, further subset 108 comprises cores 110D and 110E of the plurality 110 of cores. In embodiments, the third virtual machine is of the first type. In embodiments, the configuring of the second virtual machine comprises configuring the second virtual machine to run on any of the cores of the plurality including at least one further core 110D in the further subset 108.

In embodiments, the third virtual machine is configured to have a third priority which is higher than the second priority such that the processing resource of the at least one further core 110D is available to the third virtual machine when required by the third virtual machine instead of being available to the second virtual machine. According to embodiments, the processing resource of the at least one further core 110D is rendered preferentially to the third virtual machine when demanded at the expense of the second virtual machine.

In embodiments, the configuring of the third virtual machine comprises pinning the third virtual machine to run only on the further subset 108 of cores of the plurality. Due to this pinning, the third virtual machine is dedicated to run on cores 110D and 110E only.

In embodiments, there is no overlap between the subset 106 of cores and the further subset 108 of cores of the plurality. Due to the lack of overlap, no contention can occur between the first virtual machine and the third virtual machine (which in embodiments are both of the first type).

Figure 2:
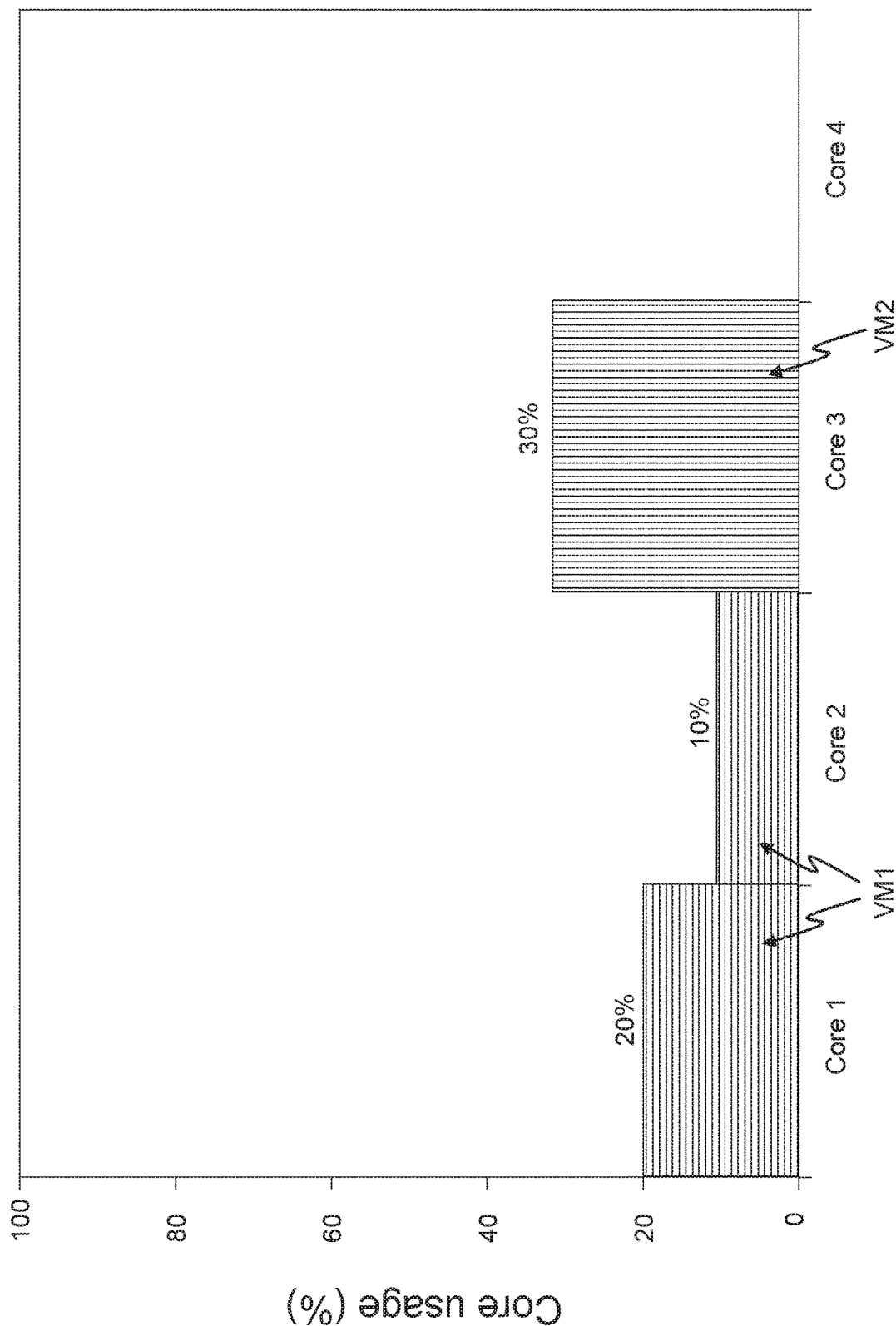
FIG. 2 is a graph illustrating processing core usage on an example host device during a light load scenario.
Figure 3:
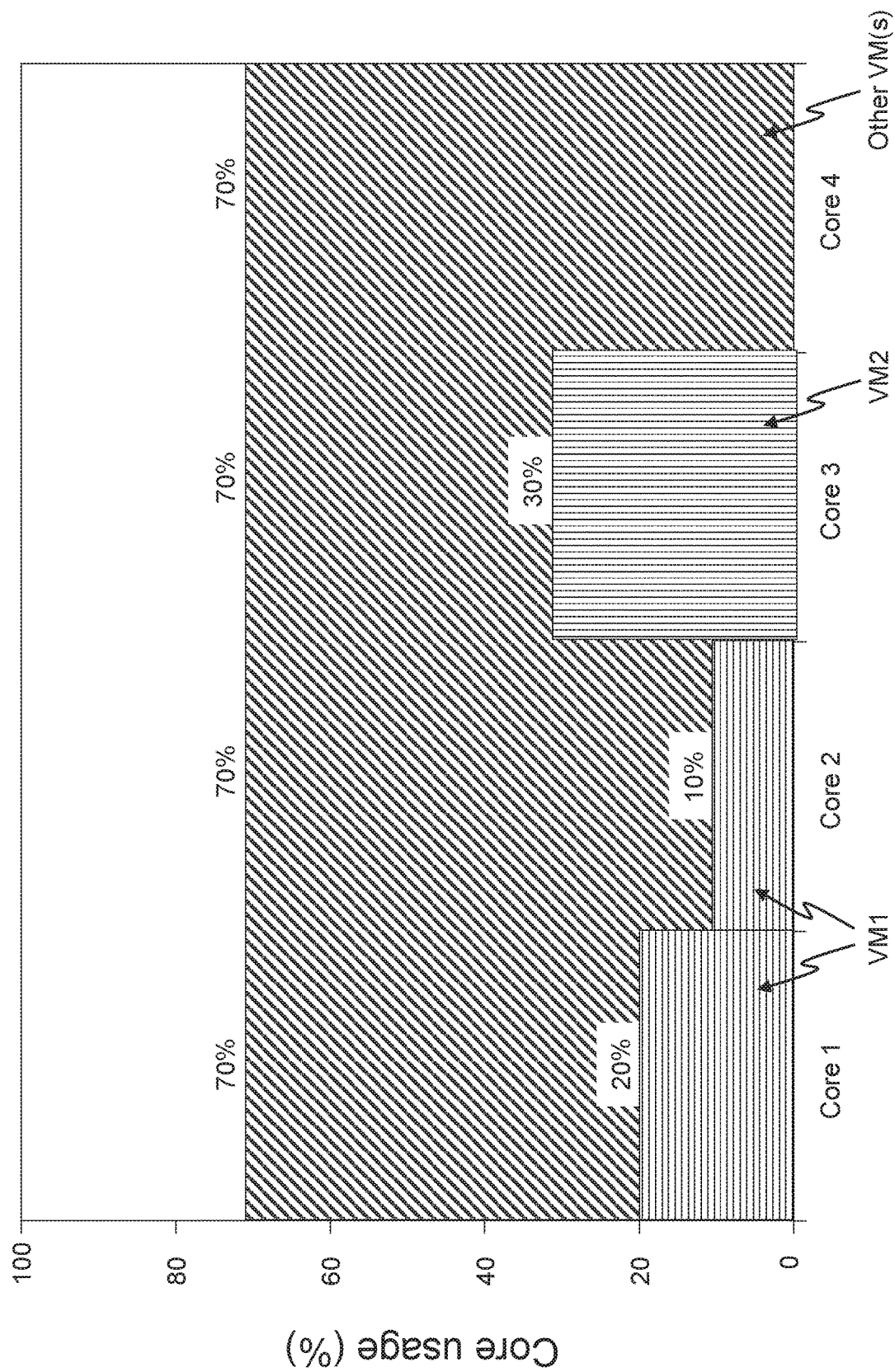
FIG. 3 is a graph illustrating processing core usage on an example host device during a moderate load scenario.
Figure 4:
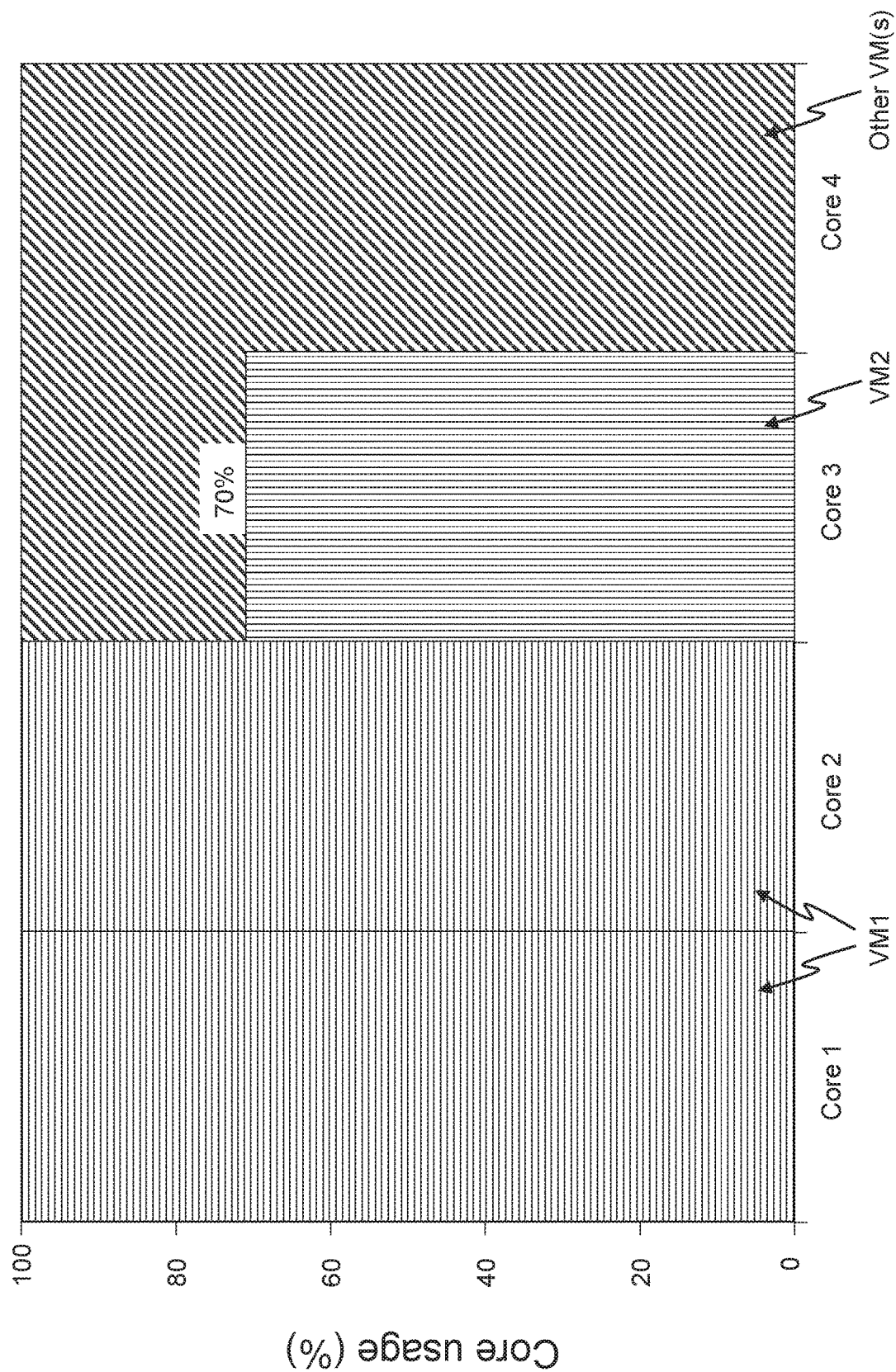
FIG. 4 is a graph illustrating processing core usage on an example host device during a heavy load scenario.

FIGS. 2 to 4 are graphs illustrating processing core usage on an example host device in three different example scenarios according to embodiments. The host device in this example has four cores: core 1, core 2, core 3 and core 4 (although in other examples, the host device can have a different number of cores). The horizontal axis shows four bars, one for each of core 1, core 2, core 3 and core 4. The vertical axis shows core usage by various virtual machines as a percentage of usage of the processing resource of each core.

FIGS. 2 to 4 contain bars with different hatching to illustrate configuration of different virtual machines on the cores. Horizontal hatching denotes a virtual machine VM1 which is pinned specifically to core 1 and core 2 only. Vertical hatching denotes a virtual machine VM2 which is pinned specifically to core 3 only. Diagonal hatching denotes one or more other virtual machines VMs which are not pinned to any particular cores. The hatched bars show which virtual machines are on which cores and the height of a bar shows the level of utilization of a core by a virtual machine.

FIG. 2 illustrates a scenario where the host device is under light load and there are only time critical virtual machines VM1 and VM2 deployed on it. Time critical virtual machines VM1 and VM2 get some fraction of the cores they are pinned to (both VM1 and VM2 get all the resources they demand). The numbers above the bars show the CPU usage. In this example, VM1 uses 20% of the resources of core 1 and 10% of the resources of core 2. VM2 uses 30% of the resources of core 3. No virtual machines are currently using any of the resources of core 4.

FIG. 3 illustrates a scenario where the host device is under moderate load, where, in addition to the loads of time critical virtual machine VM1 and time critical virtual machine VM2 as in the embodiments of FIG. 2, there are one or more non-time critical virtual machines VMs using some of the resources across the range of the cores. Each of core 1, core 2, core 3 and core 4 can be seen to be running at a total of 70%. Note that the prioritization of embodiments is not creating an effect here as there are enough processing resources for each of time critical virtual machine VM1, time critical virtual machine VM2 and non-critical virtual machines VMs for everything to run at once.

FIG. 4 illustrates a scenario where the host device is under a heavy load. Here, time critical VM1 is using 100% of the resources of core 1 and 100% of the resources of core 2. Time critical VM2 is using 70% of the resources of core 3. The prioritization of embodiments means that the non-time critical virtual machines VMs have been left with just the CPU cycles that are not required by time critical virtual machine VM1 and time critical virtual machine VM2, i.e. 30% of the processing resources of core 3 and all of the processing resources of core 4 that has no time critical virtual machines pinned to it.

Figure 5:
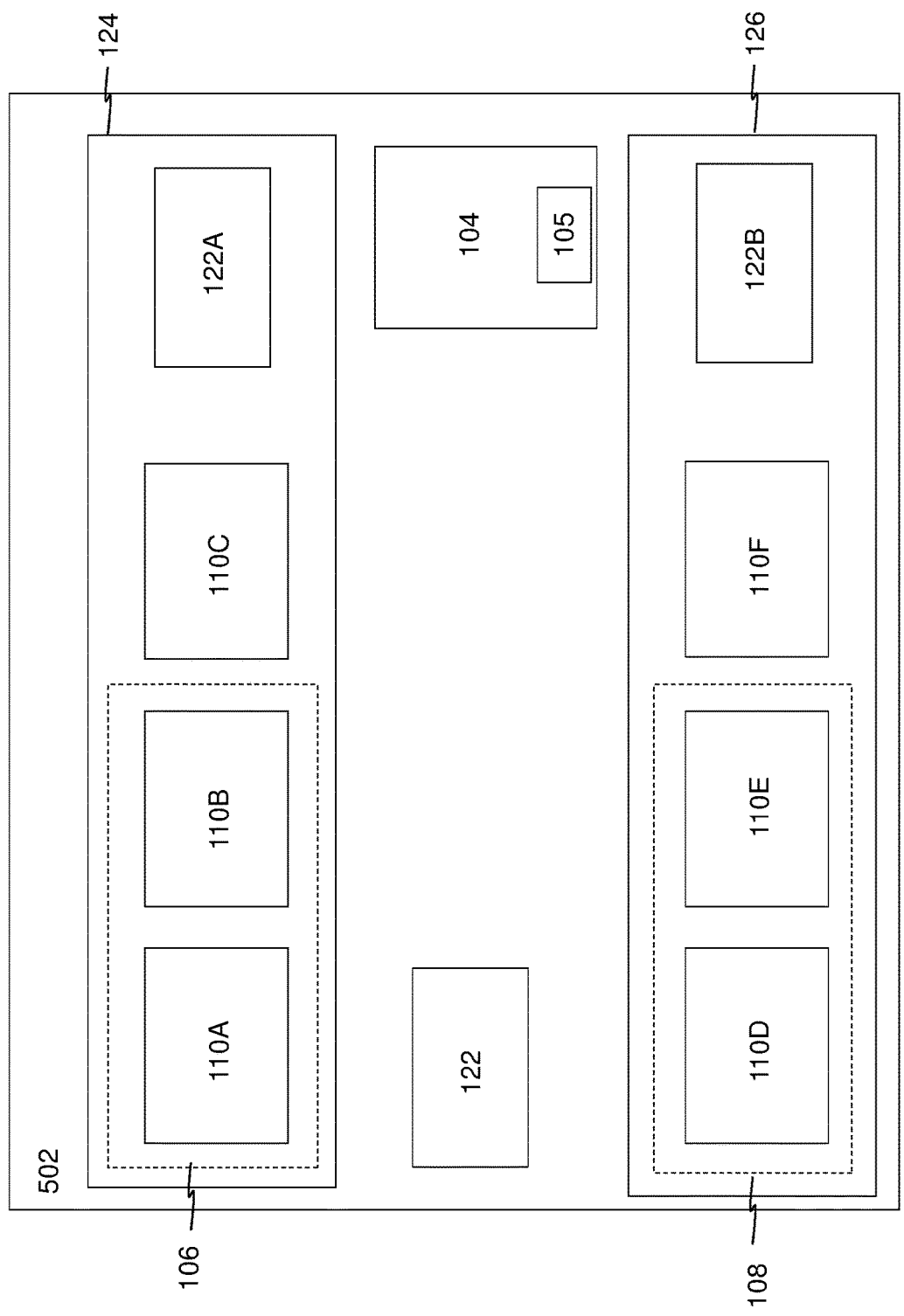
FIG. 5 shows a schematic diagram of a host device according to embodiments.

FIG. 5 shows a schematic diagram of a host device 502 according to embodiments. Host device comprises many elements similar to host device 102 depicted in FIG. 1, with similar elements having similar labels.

Host device 502 comprises a first non-uniform memory access (NUMA) node 124 and a second non-uniform memory access (NUMA) node 126.

First NUMA node 124 comprises cores 110A, 110B, 110C and a local memory 122A. Second NUMA node 126 comprises cores 110D, 110E, 110F and a local memory 122B. In embodiments, subset 106 of cores is comprised on first NUMA node 106 and further subset 108 of cores is comprised on second NUMA node 108.

In embodiments, a first time critical virtual machine is pinned to one or more cores on first NUMA node 124 and a second time critical virtual machine is pinned to one or more cores on a second, different NUMA node 126. In embodiments, no more than one time critical virtual machine is configured on each of a plurality of NUMA nodes.

In embodiments, one or more of the configuring of the first virtual machine, the configuring of the second virtual machine and the configuring of the first virtual machine to have the first priority higher than the second priority of the second virtual machine are performed at least in part using Linux control groups functionality.

Embodiments comprise disabling memory overcommit on the host device.

Embodiments of the present disclosure allow service providers to mix time critical virtual machines with non-time critical virtual machines on the same host device. Embodiments of the present disclosure allow service providers to mix time critical virtual machines with non-time critical virtual machines on the same cloud.

Some embodiments mix two existing techniques to achieve radically better results, for example allowing time critical and non-time critical services to co-exist on a set of one or more identically-configured hosts while still protecting time critical services from non-time critical ones. In embodiments, the two existing techniques are CPU pinning and prioritization.

The first technique of CPU pinning (for example in the form of OpenStack™ CPU pinning techniques) is intended to allow restriction of a virtual machine to run on a subset of CPUs on the host. A motivation for this is performance: by restricting a virtual machine to a subset of CPUs, it can optimize Layer 3 (L3) cache and NUMA performance. However, it has the side effect in some embodiments that no two virtual machines configured to use pinning will share cores. In effect, the virtual machines are guaranteed not to contend against each other. However, in embodiments, the pinned virtual machines will contend against any virtual machine that does not use pinning.

The second technique of prioritization (for example in the form of Linux priorities) allows tagging of virtual machines in OpenStack that are passed through OpenStack to the hypervisor and on to the Linux kernel to apply prioritization to a virtual machine, enforced by the Linux kernel itself. This can be used to priorities time critical services over non-time critical services according to embodiments.

Both of the above techniques can for example be implemented by OpenStack using Linux control groups (cgroups) functionality, which allows processes to be restricted in what CPUs they can run on, what priority they have, etc.

Employing CPU pinning in embodiments prevents time critical services contending against each other. Employing prioritization in embodiments allows non-time critical services to use core processing resources when time critical services are not heavily loaded, but to ensure the latter get all the core processing resources they need when they need it. Therefore, by use of embodiments, time critical services always get the core processing resources they need, and when they do not need the core processing resources, non-time critical services can make use of the core processing resources. Embodiments do not require any special configuration on the host device(s).

The idea of pinning virtual machines to particular CPU cores is known, but it is generally accepted that it is not possible or advisable to have a mix of dedicated and non-dedicated virtual machines on the same host, because the dedicated and non-dedicated virtual machines will interfere with one another; or (the same thing from a different angle) you cannot have CPU overcommit on a host where you are pinning to CPUs, and so you might as well use pinning for all virtual machines. Hence, in known systems, the cloud has to be segmented into dedicated hosts that only support CPU pinning and hosts that do not support it. However, the present inventors identified a way to do something which has been widely discussed but universally rejected as impractical (mixing pinned CPUs with non-pinned ones and allowing overcommit); the present inventors developed a way to make it work by using CPU prioritization at the same time.

Embodiments comprise splitting virtual machines into two types. "Time critical" virtual machines run applications that require uncontended access to CPU resources (for example, those performing media packet forwarding). In embodiments, time critical virtual machines are fixed to a particular NUMA node. In embodiments, non-time critical virtual machines run applications that do not have such strict requirements.

According to embodiments, to ensure that time critical virtual machines get the resources they require independent of other time critical virtual machines, the flavors are configured so that they are tied to specific CPU cores (can be cores or hyperthreads, but referred to as just cores herein) by OpenStack. In a system with only time critical virtual machines, this effectively would disable CPU overcommit (since the scheduler can only place a virtual machine where it has enough CPU cores available on a single NUMA node for it to have exclusive use of them). If embodiments were merely placing time critical virtual machines on dedicated time critical hosts, this would be a fairly standard use of OpenStack. However, in embodiments, non-time critical virtual machines are permitted to be assigned to the same hosts as time critical virtual machines. In embodiments, the non-time critical virtual machines are assigned without a scheduler taking account of the dedication of CPU cores.

To avoid time critical virtual machines suffering CPU contention from non-time critical virtual machines running on the same host, the time critical virtual machines are assigned high CPU priorities (for example using the OpenStack support for cgroups). Hence, in embodiments, a CPU scheduler does not assign any CPU cycles from a core to a non-time critical virtual machine unless any time critical virtual machine assigned to that core is not using them.

Some embodiments involve host devices operating in cloud environments. Some features of embodiments in cloud environments are described below.

Some embodiments are performed by a scheduler component responsible for allocating virtual resources to physical resources for a plurality of host devices in a cloud computing environment.

Embodiments make use of OpenStack Kilo (or other versions) and/or kernel-based virtual machine (KVM) (similar capabilities exist with other hypervisors and can also be employed in embodiments).

In embodiments, memory overcommit is disabled.

In embodiments, CPU allocation ratios are not changed from their defaults (for example 16).

In embodiments, scheduler configuration is left unchanged.

In embodiments, some example time critical flavors are configured as follows (these examples are primarily standard OpenStack flavor options (as of version Kilo)).

nova flavor-key <name>set hw:cpu_policy=dedicated
nova flavor-key <name>set hw:numa_nodes=1
nova flavor-key <name>set quota:cpu_shares=262144

In embodiments, a scheduler component assigns virtual machines to hosts in a way such that if the flavor is time critical (only), then the virtual machine is assigned to a host which can dedicate enough cores to it, where the cores are all on the same NUMA node and none of the cores are assigned another time critical virtual machine (for example a virtual machine using a "dedicated" field).

In embodiments, the scheduler assigns virtual machines to hosts in a way such that each host does not exceed the CPU allocation ratio, taking account of all of the virtual machines on the host.

As an example, consider a host with two sockets (NUMA nodes), each with 16 cores, with a CPU allocation ratio of 16, and having so much random access memory (RAM)/disk/other resources such that virtual CPUs (vCPUs) are the primary limiting factor. This hosts the following virtual machines:

An 8 vCPU time critical virtual machine, assigned to the cores on socket 0.

An 8 vCPU time critical virtual machine, assigned to the cores on socket 1.

Ten 16 vCPU non-time critical virtual machines, which are not assigned to particular cores.

Then attempting to assign another virtual machine would proceed as follows:

A 16 vCPU time critical virtual machine would fail because there are not enough vCPUs left on either socket.

An 8 vCPU time critical virtual machine would succeed because there is space on either socket, so one of the sockets can be selected (for example at random).

A 32 vCPU non-time critical virtual machine would succeed because it would not exceed the CPU allocation ratio, even though it spans both time critical virtual machines.

According to embodiments, time critical virtual machines can use all the CPU resources that they want on whichever cores they are assigned to. The time critical virtual machines are tied to cores, but have very high priority, and so in the event of contention they can take as much CPU resources as they want. Note that in some embodiments, time critical virtual machines cannot interfere with one another because they do not use overlapping sets of cores.

According to embodiments, non-time critical virtual machines can use CPU resources normally, and can float over all the cores on the host, including those used by time critical virtual machines. However, if a CPU scheduler places non-time critical virtual machines (partially or entirely) onto a core assigned to a time critical virtual machine, then they only get the CPU time that is not used by the time critical virtual machine. In embodiments, a CPU scheduler will preferentially schedule non-time critical virtual machines on CPUs which have free cycles; however, if a host device approaches 100% CPU usage then the non-time critical virtual machines are effectively only able to use the vCPUs that are not assigned to any time critical virtual machines.

An extreme case may for example comprise a media processing time critical virtual machine using Intel™'s Data Plane Development Kit (DPDK) for dataplane acceleration. Since the virtual machine has cores which tight loop pulling packets from the network, the virtual machine is at 100% CPU usage on at least some (perhaps most) cores at all times, and so those cores are (almost) completely unavailable to all other virtual machines. Note that strictly this assumes that the priority ratio is infinite, so that time critical virtual machines can employ 100% of the CPU. In practice, there is an upper limit to cgroups priority, and so non-time critical virtual machines will generally be left with some CPU resources, though that fraction may be very low (for example a few percent).

In some embodiments, a maximum possible priority is employed for time critical virtual machines, and a default priority for non-time critical virtual machines. Other embodiments employ a graded list of priorities, so that some non-time critical virtual machines have lower priority than others.

In embodiments, the OpenStack scheduler is enhanced to understand these concepts and so schedule more intelligently (for example, avoiding scheduling non-time critical virtual machines on hosts that have many time critical virtual machines and vice versa). Such embodiments may for example involve changing the core nova scheduler or implementing a scheduler metric weights plugin.

In embodiments, host device 102 comprises a controller 104 with a processor or processing system, as depicted by processor 105 in FIG. 1. In embodiments, the processing system comprises one or more processors and/or memory. Each device as described in relation to any of the embodiments described above may similarly comprise a processor and/or processing system. One or more of the aspects of the embodiments described herein with reference to the drawings comprise processes performed by host device 102. In embodiments, host device 102 comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of configuring virtual machines on a host device comprising a plurality of physical processing cores, in which processing resources of each physical processing core can be made available to one or more virtual machines, the method comprising:
   configuring a first virtual machine, comprising pinning the first virtual machine to run only on a subset of cores of the plurality of physical processing cores, the subset of cores comprising specific cores of the plurality of physical processing cores, the first virtual machine being of a first type;
   configuring a second virtual machine to run on any of the cores in the plurality of physical processing cores, the second virtual machine being of a second, different type;
   configuring the first virtual machine to have a first priority which is higher than a second priority of the second virtual machine such that processing resources of the subset of cores are available to the first virtual machine when required by the first virtual machine instead of being available to the second virtual machine; and
   prohibiting pinning of any other virtual machine of the first type on the subset of cores of the plurality of physical processing cores,
   wherein the method is performed by a scheduler component responsible for allocating virtual resources to physical resources for a plurality of host devices in a cloud computing environment.

2. The method of claim 1, wherein configuring the second virtual machine to run on any of the cores in the plurality of processing cores comprises configuring the second virtual machine to run on any of the cores in the plurality of processing cores including at least one core in the subset such that the processing resource of the at least one core is available to the first virtual machine when required by the first virtual machine instead of being available to the second virtual machine.

3. The method of claim 2, wherein the at least one core is at least partially required by the first virtual machine during a period of relatively high processing demand for the first virtual machine.

4. The method of claim 3, wherein the at least one core is fully utilised by the first virtual machine during the period of relatively high processing demand for the first virtual machine.

5. The method of claim 2, wherein the at least one core is not fully required by the first virtual machine during a period of relatively low processing demand for the first virtual machine, and
   wherein configuring the first virtual machine to have the first priority which is higher than the second priority of the second virtual machine is such that the processing resource of the at least one core is at least partially available to the second virtual machine during the period of relatively low processing demand for the first virtual machine.

6. The method of claim 1, wherein the first type comprises a type of virtual machine responsible for providing one or more time critical services.

7. The method of claim 1, wherein the second type comprises a type of virtual machine responsible for providing one or more non-time critical services.

8. The method of claim 1, wherein the first priority comprises a maximum priority and the second priority comprises a default priority.

9. The method of claim 1, comprising configuring a third virtual machine to run on a further subset of cores of the plurality of processing cores, the further subset of cores comprising specific cores of the plurality of cores such that there is no overlap between the cores and the further subset of cores of the plurality of processing cores, the third virtual machine being of the first type,
   wherein configuring of the second virtual machine comprises configuring the second virtual machine to run on any of the cores of the plurality of processing cores including at least one further core in the further subset; and configuring the third virtual machine to have a third priority which is higher than the second priority such that the processing resource of the at least one further core is available to the third virtual machine when required by the third virtual machine instead of being available to the second virtual machine.

10. The method of claim 1,
wherein there is no overlap between the subset of cores and the further subset of cores of the plurality of processing cores,
wherein the host comprises a first non-uniform memory access node and a second non-uniform memory access node,
wherein the subset of cores is comprised on the first non-uniform memory access node, and
wherein the further subset of cores is comprised on the second non-uniform memory access node.

11. The method of claim 1, wherein the first type comprises a type of virtual machine responsible for performing media packet forwarding.

12. The method of claim 1, wherein the second virtual machine acquires the second priority according to a default setting.

13. A system for use in configuring virtual machines on a host device comprising a plurality of physical processing cores, in which the processing resources of each physical processing core can be made available to one or more virtual machines, the system comprising at least one memory including computer program code; and
   at least one processor in data communication with the at least one memory, wherein the at least one processor is configured to:
   configure a first virtual machine, comprising pinning the first virtual machine to run only on a subset of cores of the plurality of physical processing cores, the subset of cores comprising specific cores of the plurality of physical processing cores, the first virtual machine being of a first type;
   configure a second virtual machine to run on any of the cores in the plurality of physical processing cores, the second virtual machine being of a second, different type;
   configure the first virtual machine to have a first priority which is higher than a second priority of the second virtual machine such that processing resources are available to the first virtual machine when required by the first virtual machine instead of being available to the second virtual machine; and
   prohibit pinning of any other virtual machine of the first type on the subset of cores of the plurality of physical processing cores;
   wherein the method is performed by a scheduler component responsible for allocating virtual resources to physical resources for a plurality of host devices in a cloud computing environment.

14. A non-transitory computer-readable storage medium comprising computer-executable instructions which, when executed by a processor, cause a computing device to perform a method of configuring virtual machines on a host device comprising a plurality of physical processing cores, in which processing resources of each physical processing core can be made available to one or more virtual machines, the method comprising:
   configuring a first virtual machine, comprising pinning the first virtual machine to run only on a subset of cores of the plurality of physical processing cores, the subset of cores comprising specific cores of the plurality of physical processing cores, the first virtual machine being of a first type;
   configuring a second virtual machine to run on any of the cores in the plurality of processing cores, the second virtual machine being of a second, different type;
   configuring the first virtual machine to have a first priority which is higher than a second priority of the second virtual machine such that processing resources are available to the first virtual machine when required by the first virtual machine instead of being available to the second virtual machine; and
   prohibiting pinning of any other virtual machine of the first type on the subset of cores of the plurality of physical processing cores,
   wherein the method is performed by a scheduler component responsible for allocating virtual resources to physical resources for a plurality of host devices in a cloud computing environment.

15. A method of configuring virtual machines on a host device comprising a plurality of physical processing cores, in which processing resources of each physical processing core can be made available to one or more virtual machines, the method comprising:
   configuring a first virtual machine, comprising pinning the first virtual machine to run only on a subset of cores of the plurality of physical processing cores, the subset of cores comprising specific cores of the plurality of physical processing cores, the first virtual machine being of a first type;
   configuring a second virtual machine to run on any of the cores in the plurality of physical processing cores, the second virtual machine being of a second, different type;
   configuring the first virtual machine to have a first priority which is higher than a second priority of the second virtual machine such that processing resources of the subset of cores are available to the first virtual machine when required by the first virtual machine instead of being available to the second virtual machine; and
   prohibiting pinning of any other virtual machine of the first type on the subset of cores of the plurality of physical processing cores,
   wherein the first priority comprises a maximum priority and the second priority comprises a default priority.

16. A method of configuring virtual machines on a host device comprising a plurality of physical processing cores, in which processing resources of each physical processing core can be made available to one or more virtual machines, the method comprising:
   configuring a first virtual machine, comprising pinning the first virtual machine to run only on a subset of cores of the plurality of physical processing cores, the subset of cores comprising specific cores of the plurality of physical processing cores, the first virtual machine being of a first type;
   configuring a second virtual machine to run on any of the cores in the plurality of physical processing cores, the second virtual machine being of a second, different type;
   configuring the first virtual machine to have a first priority which is higher than a second priority of the second virtual machine such that processing resources of the subset of cores are available to the first virtual machine when required by the first virtual machine instead of being available to the second virtual machine; and prohibiting pinning of any other virtual machine of the first type on the subset of cores of the plurality of physical processing cores,
wherein the first type comprises a type of virtual machine responsible for performing media packet forwarding.

* * * * *